Patented Dec. 9, 1930

1,784,598

UNITED STATES PATENT OFFICE

HANS JORDAN, OF BERLIN-STEGLITZ, WALTER SCHOELLER, OF BERLIN-WESTEND, AND REINHARD CLERC, OF BERLIN, GERMANY, ASSIGNORS TO THE FIRM: CHEMISCHE FABRIK AUF ACTIEN VORM. E. SCHERING, OF BERLIN, GERMANY

PROCESS FOR THE PRODUCTION OF THYMOL

No Drawing. Application filed August 15, 1927, Serial No. 213,204, and in Germany February 22, 1927.

Our invention refers to the production of 3-methyl-6-isopropyl phenol (thymol) and its isomers and homologues, and more especially to a process which allows producing thymol in a particularly simple manner and at low cost.

The invention is based primarily on the discovery disclosed in the application for patent of the United States filed by Walter Schoeller and Hans Jordan, Serial No. 200,297, that thymol and p-thymol can be obtained by treating the products which result in the decomposition of the condensation products from m- or p-cresol and acetone with hydrogen, until two hydrogen atoms have entered into combination. A method of producing these condensation products by heating the starting materials to a temperature below 100° C. in the presence of a condensing agent was disclosed in Jordan's patent application Serial No. 200,289, and it had also been stated that, if instead of pure m-cresol or p-cresol crude cresol (cresolum crudum), which is a mixture of m- and p-cresol, is used as starting product in the condensation process, decomposition at about 300° C. of the condensation product obtained will result in the formation of a mixture of 3-methyl-6-isopropylene phenol and 4-methyl-6-isopropylene phenol.

We have now ascertained that if this mixture of isomers is treated with hydrogen as afore described, contrary to all expectations a carefully conducted fractional distillation assisted, if necessary, by a freezing out treatment, will allow recovering the two components, viz. thymol and p-thymol, separately in a practically satisfactory manner. In view of the well known close relation of the boiling points (234° C. for thymol against 229° C. for p-thymol) this possibility could not be foreseen and it is the more surprising, as the two cresols (m-cresol and p-cresol) having similarly closely related boiling points cannot properly be separated by physical methods. In view of the low price of crude cresol this invention is of particular importance from an economical point of view.

Example

The product of condensation from crude cresol and acetone described in Hans Jordan's application Serial No. 200,289 (which can be obtained by heating the starting materials to a temperature below 100° C. in the presence of a condensing agent, for instance hydrochloric acid) is heated to about 300° C., and the mixture of 3-methyl-6-isopropylene phenol and 4-methyl-6-isopropylene phenol is treated with hydrogen at 140–160° C., if desired under pressure, in the presence of hydrogenation catalyst containing Ni and another metal, such as Ca, Co, Fe, and the like, either in reduced state or as carbonates, hydroxides or the like, until 2 atoms hydrogen have entered into combination. The resulting mixture of thymol and p-thymol is subjected to fractional distillation in a distillation column, preferably in vacuo. From the higher boiling fractions thymol can be recovered in a well known manner.

The hydrogenation catalyst mentioned above may be one of the metal catalysts usually employed in the hydrogenation of unsaturated compounds. It may be a mere nickel catalyst or it may contain, besides nickel, other metals such as iron, copper or cobalt. Such catalysts are produced in a well known manner by precipitating from a solution of the metal salts the carbonates or hydroxides, which are well rinsed, dried and finely ground. The oxygen compounds of the metals may be reduced either before or preferably at the beginning of hydrogenation, right in the hydrogenation vessel (see Sabatier, Die Katalyse in der organischen Chemie-Leipzig, 1927-page 386).

Various changes may be made in the details disclosed in the foregoing specification without departing from the invention or sacrificing the advantages thereof.

We claim:—

1. The process of producing 3-methyl-6-isopropyl phenol comprising heating the product obtained by condensing a crude cresol (being substantially a mixture of m- and p-cresol) and acetone in the presence of an acid condensing agent to effect decomposition thereof, treating the decomposition product with hydrogen in the presence of a hydrogenation catalyst until two atoms hydrogen have entered into combination, and subjecting the resulting mixture of thymol and p-thymol to careful fractional distillation.

2. The process of producing 3-methyl-6-isopropyl phenol comprising heating the product obtained by condensing a crude cresol (being substantially a mixture of m- and p-cresol) and acetone in the presence of an acid condensing agent to effect decomposition thereof, treating the decomposition product with hydrogen in the presence of a hydrogenation catalyst until two atoms hydrogen have entered into combination, and subjecting the resulting mixture of thymol and p-thymol to careful fractional distillation in vacuo.

3. The process of producing 3-methyl-6-isopropyl phenol comprising heating the product obtained by condensing a crude cresol (being substantially a mixture of m- and p-cresol) and acetone in the presence of an acid condensing agent to effect decomposition thereof, treating the decomposition product with hydrogen in the presence of a hydrogenation catalyst until two atoms hydrogen have entered into combination, and subjecting the resulting mixture of thymol and p-thymol to careful fractional distillation and to freezing-out.

In testimony whereof we affix our signatures.

HANS JORDAN.
WALTER SCHOELLER.
REINHARD CLERC.